(12) United States Patent
Tsukagoshi et al.

(10) Patent No.: US 9,676,365 B2
(45) Date of Patent: Jun. 13, 2017

(54) SIDE AIRBAG DEVICE

(71) Applicant: Autoliv Development AB, Vårgårda (SE)

(72) Inventors: Yuichiro Tsukagoshi, Yokohama (JP); Kim Minfun, Yokohama (JP)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 15/096,880

(22) Filed: Apr. 12, 2016

(65) Prior Publication Data

US 2016/0304047 A1 Oct. 20, 2016

(30) Foreign Application Priority Data

Apr. 14, 2015 (JP) .................................. 2015-082735
Jan. 18, 2016 (JP) .................................. 2016-006986

(51) Int. Cl.
| | | |
|---|---|---|
| *B60R 21/239* | (2006.01) | |
| *B60R 21/231* | (2011.01) | |
| *B60R 21/233* | (2006.01) | |
| *B60R 21/2338* | (2011.01) | |

(52) U.S. Cl.
CPC .......... *B60R 21/239* (2013.01); *B60R 21/233* (2013.01); *B60R 21/23138* (2013.01); *B60R 2021/23146* (2013.01); *B60R 2021/23324* (2013.01); *B60R 2021/23382* (2013.01)

(58) Field of Classification Search
CPC ............ B60R 21/239; B60R 21/23138; B60R 21/233; B60R 2021/23146; B60R 2021/23324; B60R 2021/23382
See application file for complete search history.

(56) References Cited

U.S. PATENT DOCUMENTS

| | | | | |
|---|---|---|---|---|
| 6,349,964 B1 * | 2/2002 | Acker | ............... | B60R 21/23138 |
| | | | | 280/730.1 |
| 6,561,539 B1 * | 5/2003 | Sunabashiri | ...... | B60R 21/23138 |
| | | | | 280/729 |
| 7,384,062 B2 * | 6/2008 | Yokoyama | ........ | B60R 21/23138 |
| | | | | 280/730.2 |

(Continued)

FOREIGN PATENT DOCUMENTS

| | | |
|---|---|---|
| JP | WO 02/100691 A1 | 12/2002 |
| JP | 2005225351 A * | 8/2005 |

*Primary Examiner* — Drew J Brown
(74) *Attorney, Agent, or Firm* — Brinks Gilson & Lione

(57) ABSTRACT

A side airbag device is provided, which is capable of increasing an energy absorption amount while suppressing the load on an occupant. The side airbag device includes: a bag-shaped cushion; an inflator provided on a vehicle rear side inside the cushion; an inner tube that surrounds the inflator; an upper opening and a lower opening formed in the inner tube; a tether that extends toward a vehicle front side from the inner tube to partition the vehicle front side of the inside of the cushion into a chest restraining portion and a waist restraining portion; a void portion provided inside the cushion on the vehicle front side of the tether; and a vent hole formed near the void portion. The upper opening has a smaller opening area than the lower opening, and the tether is inclined downward toward the vehicle front side from the vehicle rear side.

9 Claims, 5 Drawing Sheets

(56) References Cited

U.S. PATENT DOCUMENTS

| | | | |
|---|---|---|---|
| 7,793,973 B2* | 9/2010 | Sato | B60R 21/23138 280/729 |
| 2004/0021304 A1* | 2/2004 | Tanase | B60R 21/207 280/729 |
| 2005/0248132 A1* | 11/2005 | Wheelwright | B60R 21/23138 280/729 |
| 2006/0022441 A1* | 2/2006 | Hayashi | B60R 21/207 280/730.2 |
| 2007/0228701 A1* | 10/2007 | Yamamura | B60R 21/23138 280/730.2 |
| 2007/0267854 A1* | 11/2007 | Fukuda | B60R 21/23138 280/730.2 |
| 2014/0145422 A1* | 5/2014 | Koike | B60R 21/233 280/743.1 |
| 2015/0076803 A1* | 3/2015 | Fujiwara | B60R 21/207 280/730.2 |
| 2015/0367806 A1* | 12/2015 | Fujiwara | B60R 21/233 280/729 |
| 2016/0114757 A1* | 4/2016 | Fujiwara | B60R 21/23138 280/729 |
| 2016/0264091 A1* | 9/2016 | Fujiwara | B60R 21/2346 |

* cited by examiner

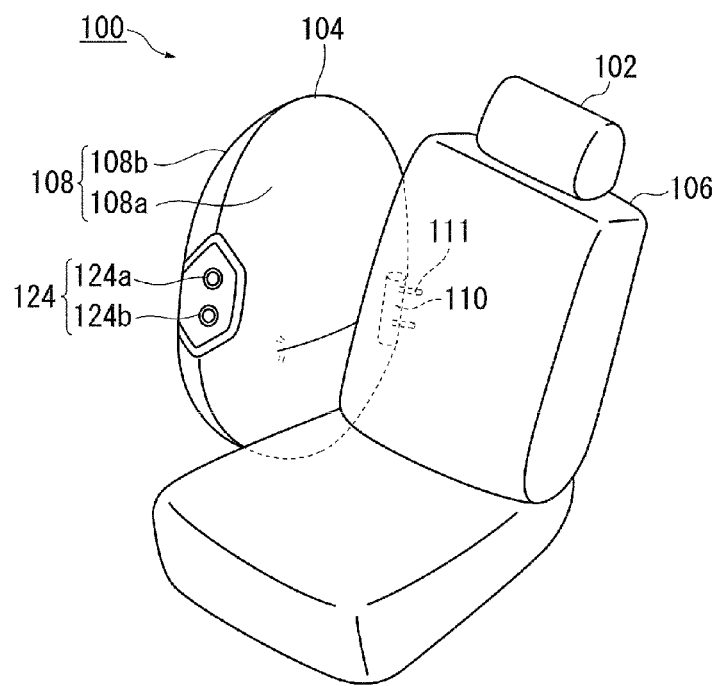
FIGURE 1A
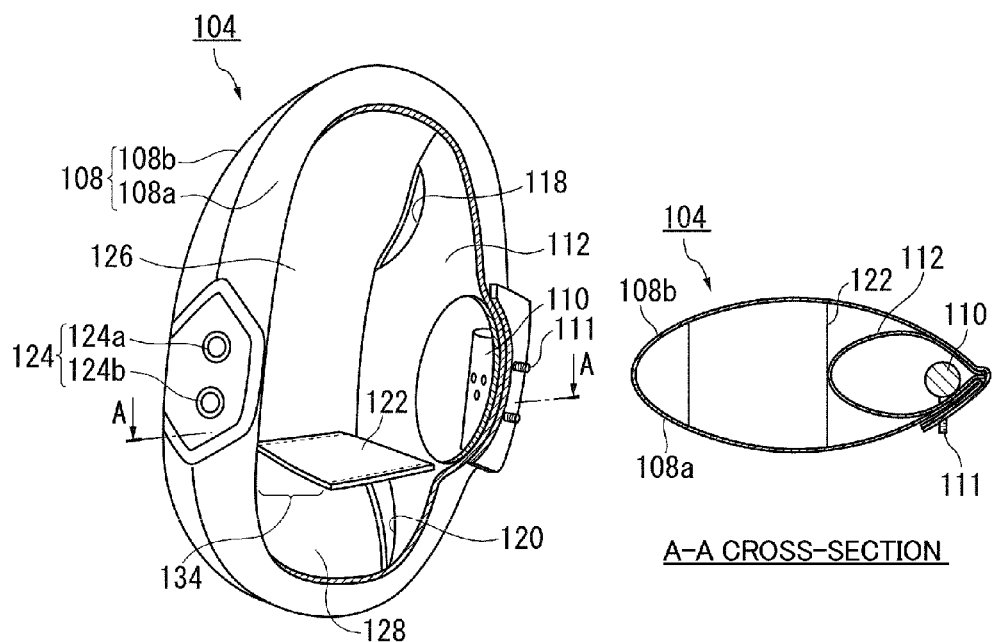
FIGURE 1B
A-A CROSS-SECTION
FIGURE 1C

FIGURE 2A
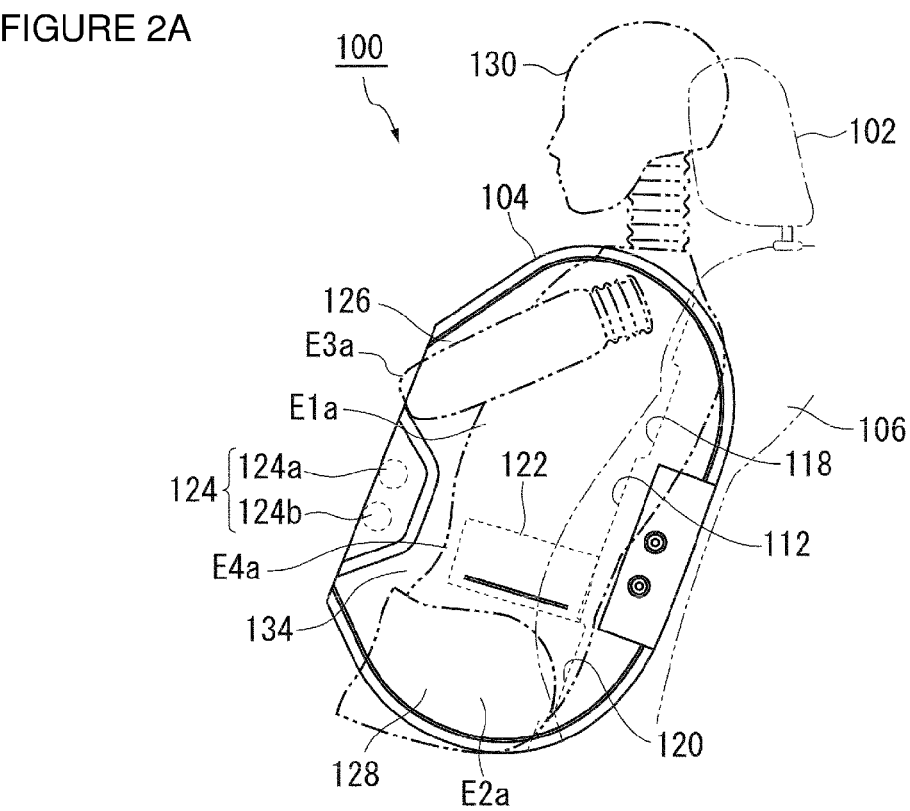
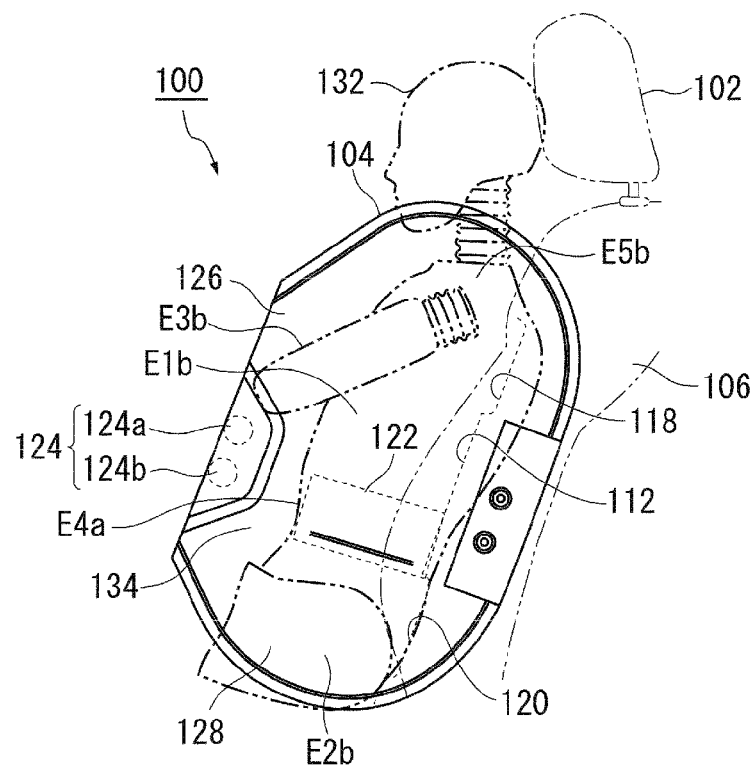
FIGURE 2B

SIDE AIRBAG DEVICE

CROSS REFERENCE TO RELATED APPLICATIONS

This application claims priority to Japanese Patent Application Nos. JP2015-082735, filed Apr. 14, 2015 and JP2016-006986, filed Jan. 18, 2016.

BACKGROUND OF THE INVENTION

1. Field of the Invention

The present invention relates to a side airbag device that restrains an occupant in a vehicle seat from a lateral side when an impact is imposed on the vehicle.

2. Description of the Related Art

In recent years, most vehicles are standard-equipped with airbags. Airbags are safety devices that operate in an emergency situation such as vehicle crashes and are inflated and deployed with gas pressure to receive and protect an occupant. Airbags come in various types depending on their installed position and their purpose. For example, a front seat driver airbag device is provided at the center of a steering wheel to protect an occupant from crashes occurring in a front-rear direction. Moreover, a curtain airbag device is often provided near the roof rail above a side window to protect occupants from an impact applied from a vehicle width (side impact) direction resulting from side crashes or the like, and a side airbag device may also be provided in a side portion of a seat.

The cushions of various airbag devices often have a structure designed by taking a desired behavior during deployment, occupant restraining force, and the like into consideration. For example, International Patent Publication No. WO2002/100691 discloses a side airbag device having a dual structure in which an inner bag is provided inside an outer bag. International Patent Publication No. WO2002/100691 discloses a configuration in which an inner bag is provided in a lower portion and the lower portion is inflated earlier than an upper portion to restrain the waist of an occupant with the high internal pressure.

The ribs of the chest of a person are narrower than the pelvis in the waist, and many vital internal organs are present in the chest. In general, when an occupant is restrained by the cushion of a side airbag device, the chest tends to have a higher injury level than the waist. Thus, the cushion of the side airbag device needs to suppress the load on the chest of an occupant.

In the side airbag device of International Patent Publication No. WO2002/100691, a vent hole is formed in an upper portion. The vent hole is a structure for discharging gas outside the airbag, and International Patent Publication No. WO2002/100691 describes that the stiffness of an airbag (cushion) is adjusted by the discharge of gas. However, when the position of the vent hole is taken into consideration as well as forming the vent hole, it is advantageous in realizing efficient gas discharge and adjusting the internal pressure of the cushion. Moreover, for example, although a method of increasing the diameter of the vent hole to increase a discharge amount can be considered, the energy absorption amount of the cushion may decrease if the diameter of the vent hole is increased too much.

SUMMARY AND INTRODUCTORY DESCRIPTION OF THE INVENTION

In view of such a problem, an object of the present invention is to provide a side airbag device capable of increasing an energy absorption amount while suppressing the load on an occupant.

In order to solve the problem, according to a representative embodiment of the present invention, there is provided a side airbag device including: a cushion formed in a bag form using a base fabric so as to be inflated and deployed toward a lateral side of an occupant in a vehicle seat; an inflator provided on a vehicle rear side inside the cushion so as to supply gas; an inner tube formed of a base fabric and provided inside the cushion so as to surround the inflator and receive the gas first; an upper opening formed in an upper portion of the inner tube so that gas can pass therethrough; a lower opening formed in a lower portion of the inner tube so that gas can pass therethrough; a partition wall formed of a base fabric so as to extend toward a vehicle front side from a region between the upper opening and the lower opening of the inner tube and partition the vehicle front side of the inside of the cushion into a chest restraining portion on an upper side and a waist restraining portion on a lower side; a void portion provided inside the cushion at a position further toward the vehicle front side of the partition wall so that gas can pass between the chest restraining portion and the waist restraining portion; and a vent hole formed in the base fabric of the cushion near the void portion so that gas can be discharged to the outside of the cushion, wherein the upper opening has a smaller opening area than the lower opening, and the partition wall is inclined downward toward the vehicle front side from the vehicle rear side, relative to a vertical line defined by the inner tube.

According to the above described configuration, since the upper opening has a smaller opening area than the lower opening, it is possible to suppress the inflation pressure and therefore the rigidity of the chest restraining portion to be smaller than that of the waist restraining portion. Thus, it is possible to suppress the load on the chest of the occupant. Moreover, since the partition wall is inclined downward toward the vehicle front side in relation to the inner tube (as described above), it is possible to retard the entrance of gas from the waist restraining portion to the chest restraining portion on the upper side and to avoid an abrupt increase in the rigidity of the chest restraining portion.

When the vent hole is formed at the position described, a predetermined amount of gas having flowed into the waist restraining portion on the lower side of the partition wall can be efficiently discharged in the midway of flowing toward the chest restraining portion on the upper side. Thus, it is possible to suppress an abrupt increase in the rigidity of the chest restraining portion. Due to these configurations, the restraint force (the load on the occupant) of the chest restraining portion during occupant restraint is suppressed. Thus, the cushion does not need to adjust the restraint force based on the size of the diameter of the vent hole and the diameter of the vent hole can be decreased to be smaller than that of the conventional vent hole. As a result, it is possible to decrease the diameter of the vent hole to decrease the amount of gas discharged from the vent hole during occupant restraint and to increase the energy absorption amount of the cushion.

The inner tube may be provided in a state in which a portion of the base fabric disposed in a bag form inside the cushion overlaps an outer circumferential portion of the cushion, and the portion of the base fabric and the outer circumferential portion of the cushion are sewn together. With this configuration, a bag-shaped inner tube can be realized ideally. Moreover, since flapping of an end of the inner tube during deployment of the inner tube is suppressed, it is possible to stabilize the deployment behavior.

An end on the vehicle rear side of the partition wall may be in contact with the inner tube. Due to this, since gas rarely flows between the partition wall and the inner tube, it is possible to prevent a rapid flow of gas at the position near the chest. Moreover, since it is possible to prevent an abrupt increase in the rigidity of the chest restraining portion, it is possible to further suppress the load on the chest.

The vent hole may be formed on an extension line of the partition wall extending from the inner tube. According to this configuration, the gas flowing along the partition wall can be discharged efficiently. For example, although the internal pressure during inflation and deployment may increase too much when the diameter of the vent hole is decreased as described above, since the partition wall is configured to extend toward the vent hole, it is possible to improve the gas discharge efficiency and to appropriately suppress the internal pressure.

According to the present invention, it is possible to provide a side airbag device capable of increasing an energy absorption amount while suppressing the load on an occupant.

BRIEF DESCRIPTION OF THE DRAWINGS

FIGS. 1A to 1C are diagrams illustrating a side airbag device according to a first embodiment of the present invention shown in a deployed, fully inflated condition;

FIGS. 2A and 2B are diagrams illustrating a cushion illustrated in FIG. 1B with an occupant superimposed thereon, shown in a deployed, fully inflated condition;

Figure 3A:
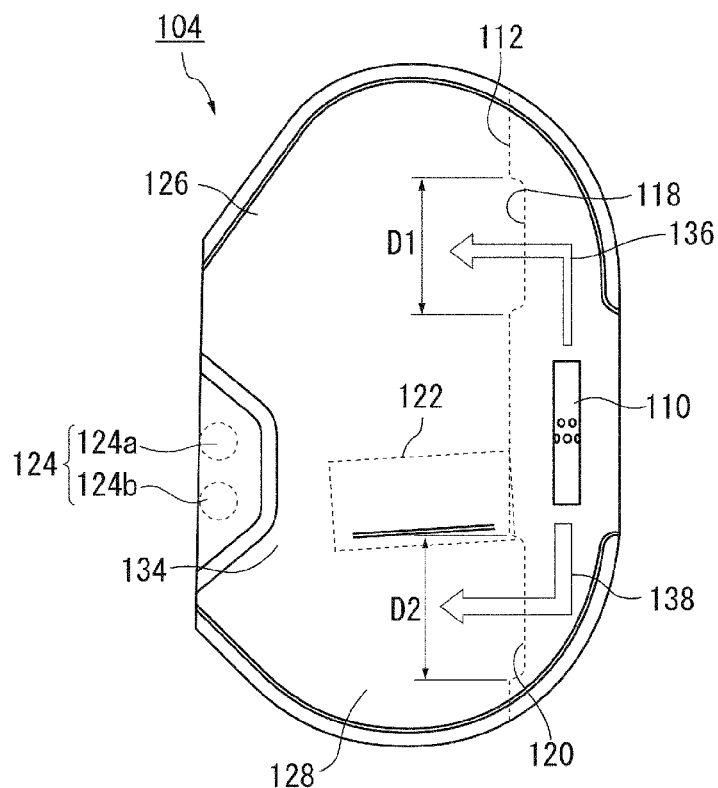
FIGS. 3A and 3B are diagrams illustrating the flow of gas during inflation and deployment of the cushion illustrated in FIG. 2A and the like, showing the airbag in an undeployed, laid flat condition.

DESCRIPTION OF THE PREFERRED
EMBODIMENTS

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

FIGS. 1A to 1C are diagrams illustrating a side airbag device 100 according to a first embodiment of the present invention, showing the airbag in a deployed, fully inflated condition. FIG. 1A illustrates the side airbag device 100 and a seat 102 on the vehicle right side, to which the side airbag device 100 is applied, from the inner side in a vehicle width direction. As illustrated in FIGS. 1A to 1C, the side airbag device 100 is configured such that a cushion 104 is inflated and deployed toward a lateral side of the seat 102.

The cushion 104 is a bag-shaped portion that receives an occupant in an emergency situation such as when an impact is imposed on a vehicle. The cushion 104 is inflated and deployed in a flat shape between an occupant and a side door. The cushion 104 is formed in a bag form by sewing or bonding a plurality of base fabrics in an overlapped manner. The cushion 104 is accommodated in a housing (not illustrated) provided in a lateral portion of a seatback 106 in a rolled or folded state. The cushion 104 in the accommodated state is not visible from the outside since the cushion 104 is covered by a seat cover or the like. When the side airbag device 100 operates, the cushion 104 splits the seat cover or the like and is inflated and deployed toward a lateral side of an occupant to restrain the occupant from the lateral side.

An inflator 110 is provided in the lateral portion of the seatback 106 together with the cushion 104. The inflator 110 is a gas generator and is configured to receive an activation signal transmitted from a vehicle controller in the event of an impact to supply gas into the cushion 104. The inflator 110 used in the present embodiment is a cylindrical (tubular) inflator and is included on the vehicle rear side of the inside of the cushion 104 so that a longitudinal direction thereof extends in an up-down direction.

FIG. 1B is a diagram illustrating the inside of the cushion 104 illustrated in FIG. 1A. FIG. 1B illustrates an inner configuration of a main panel 108 that forms the surface of the cushion 104 while omitting a portion of a main panel 108a on the vehicle interior side. An opening (not illustrated) through which the inflator 110 is inserted and a plurality of holes through which a stud bolt 111 of the inflator 110 passes are formed on the vehicle rear side of the cushion 104. The cushion 104 is closed in a state in which a portion near the opening is folded toward the stud bolt 111 after the inflator 110 is inserted. The cushion 104 is attached to a housing or the like on the lateral side of the seatback 106 using the stud bolt 111.

Inflators used at present come in various types such as an inflator which is filled with a gas generating agent to generate gas by combusting the gas generating agent, an inflator which is filled with compressed gas to supply gas without generating heat, or a hybrid inflator which uses both combustion gas and compressed gas. Any one of these types of inflators can be used as the inflator 110.

An inner tube 112 is provided inside the cushion 104. The inner tube 112 is a portion that first receives the gas from the inflator 110 and surrounds the inflator 110 at the inside of the cushion 104. FIG. 1B illustrates the inflator 110 inside the inner tube 112 while omitting a portion of the inner tube 112.

FIG. 1C is a cross-sectional view along line A-A, of the cushion 104 illustrated in FIG. 1B. As illustrated in FIG. 1C, the inner tube 112 is provided in a bag form that includes the inflator 110. The inner tube 112 can be provided in a state in which a base fabric conforming to the shape on the vehicle rear side, of the cushion, for example, is folded and disposed in a bag form, a portion of the bag-shaped base fabric is superimposed on an outer circumferential portion of the main panel 108a and 108b, and the two portions are sewn together. With this configuration, since flapping of an end on the vehicle rear side of the inner tube 112 during deployment of the inner tube 112 is suppressed, it is possible to stabilize the deployment behavior.

A region on the vehicle rear side of the cushion 104 in which the inner tube 112 is included is mainly inflated and deployed inside the seatback 106. A portion of the cushion 104 on the vehicle front side of the inner tube 112 is a portion that is inflated and deployed from the seatback 106 toward the vehicle front side and restrains a wide range of the body of the occupant.

Description will be provided with reference to FIG. 1B again. Two openings including an upper opening 118 and a lower opening 120 are formed in the inner tube 112 as portions through which gas is supplied toward the vehicle front side of the cushion 104. The gas supplied from the inflator 110 passes through the upper opening 118 and the lower opening 120 to flow toward the vehicle front side. In this manner, in the embodiment, the inner tube 112 first receives the gas from the inflator 110 and the gas is then supplied from the inner tube 112 to the entire cushion 104.

A tether 122 is provided on the vehicle front side of the inside of the cushion 104 as a partition wall of the present embodiment. The tether 122 partitions the inside of the cushion 104 into a chest restraining portion 126 on the upper side and a waist restraining portion 128 on the lower side. The tether 122 is provided by bonding a predetermined base fabric to the main panel 108a on the vehicle interior side and the main panel 108b on the vehicle exterior side of the cushion 104 in the vehicle width direction. The tether 122 is provided so as to extend in the vehicle width direction and has a function of adjusting the thickness in the vehicle width direction of the cushion 104 to a predetermined thickness. In the present embodiment, although the partition wall is referred to as a tether since the partition wall is stretched in a strip form in the vehicle width direction, the partition wall may be referred to as a baffle when the partition wall is stretched in a planar form in the other direction.

The tether 122 has a rear end positioned near the vehicle front side of a region between the upper opening 118 and the lower opening 120 of the inner tube 112 and extends downward from this region toward the vehicle front side. In this description "downwardly" refers to a perpendicular orientation with respect to a vertical axis defined by the front edge of inner tube 112. It is noted that, as tether 122 is illustrated in FIGS. 2A and 2B, the tether is not downwardly oriented in the vehicle front direction with respect to gravity in the fully inflated, as installed condition in a vehicle. However, in the undeployed airbag, the downward orientation is provided as further described with reference to FIGS. 3A and 3B discussed below. Specifically, the tether 122 is preferably provided so that the rear end on the vehicle rear side collides with the inner tube 112 during inflation and deployment of the cushion 104. In this case, the tether 122 may not be bonded (sewn) to the inner tube 112.

A void portion 134 is provided near the vehicle front side of the tether 122 so that gas can pass between the chest restraining portion 126 and the waist restraining portion 128.

A vent hole 124 is formed in the main panel 108 on the vehicle front side of the cushion 104 near the void portion 134. The vent hole 124 is a hole through which gas is discharged to the outside and includes two holes including a vent hole 124a on the upper side and a vent hole 124b on the lower side. The vent hole 124 has a function of discharging gas appropriately to suppress an increase in the internal pressure of the cushion 104 to prevent burst.

FIGS. 2A and 2B are diagrams illustrating the cushion illustrated in FIG. 1B with an occupant superimposed thereon, showing the airbag in a deployed, fully inflated condition. An occupant 130 illustrated in FIG. 2A assumes an adult male and is depicted using a dummy doll corresponding to the adult male. As illustrated in FIG. 2A, the chest restraining portion 126 restrains the chest E1a, the arm E3a, and the abdomen E4a of the occupant 130 in a sitting state from the lateral side. The waist restraining portion 128 restrains the waist E2a of the occupant 130 in a sitting state from the lateral side.

An occupant 132 illustrated in FIG. 2B assumes an adult female having a small physique and is depicted using a dummy doll corresponding to the adult female having a small physique. In the case of the adult female having a small physique, the chest restraining portion 126 restrains a wide region including the shoulder E5b as well as the chest E1b, the arm E3b, and the abdomen E4b.

As described above, the side airbag device 100 is configured such that the inner tube 112 on the vehicle rear side first receives gas and the entire cushion 104 is inflated and deployed from the inner tube 112. With this configuration, it is possible to decrease force application on an occupant (generally referred to as an out-of-position occupant) present at an unexpected position other than a normal sitting state, for example. For example, when an occupant is present near the vehicle exterior side of a seat, the occupant is positioned on the vehicle front side of the cushion 104 and the cushion 104 makes contact with the occupant. However, since the inner tube 112 first receives gas, the rigidity of the main panel 108a and 108b of the cushion 104 is slightly decreased immediately after activation of the inflator 110, and the input load on the out-of-position occupant can be reduced.

As can be understood from FIGS. 2A and 2B, the chest restraining portion 126 restrains a wide region of the upper part around the chest of the occupant. However, the bones in the chest are narrower than those of the waist, and important internal organs are present in the chest. Thus, it is preferable to suppress the restraint force (the load on an occupant) of the chest restraining portion 126 to be smaller than that of the waist restraining portion 128.

Figure 3B:
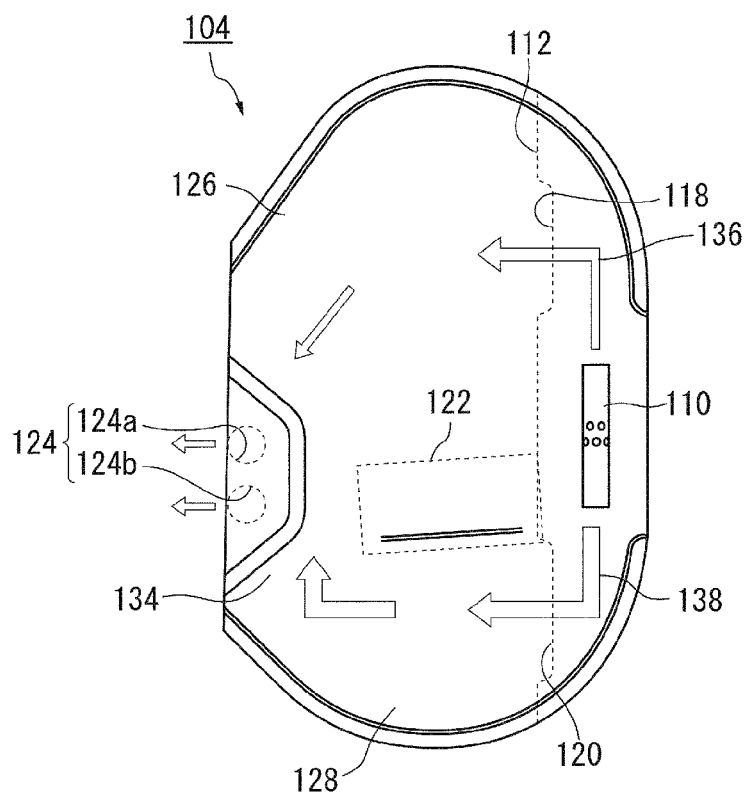

In the present embodiment, the inner configuration of the cushion 104 is modified so that an overall energy absorption amount can be improved while suppressing the load mainly on the chest of each occupant. FIGS. 3A and 3B are diagrams illustrating the flow of gas during inflation and deployment of the cushion 104 illustrated in FIG. 2A and the like, showing the airbag in an undeployed, laid flat condition. Hereinafter, the flow of gas in the cushion 104 will be described mainly.

FIG. 3A illustrates the flow of gas immediately after activation of the inflator 110. As illustrated in FIG. 3A, in the present embodiment, an opening area D1 of the upper opening 118 of the inner tube 112 is smaller than an opening area D2 of the lower opening 120 (D1>D2). Due to this, immediately after activation of the inflator 110, an inflow rate per unit time of gas 136 flowing into the chest restraining portion 126 is smaller than an inflow rate of gas 138 flowing into the waist restraining portion 128. Thus, an abrupt increase in the rigidity of the chest restraining portion 126 can be prevented, the load on the chest of the occupant can be suppressed.

On the vehicle front side of the inside of the cushion 104, the end on the vehicle rear side of the tether 122 is in contact with the inner tube 112. Thus, gas rarely flows upward between the tether 122 and the inner tube 112. Due to this, it is possible to prevent a rapid flow of gas at the position near the chest and to avoid an abrupt increase in the rigidity of the chest restraining portion 126. With this configuration, the load on the chest of the occupant is suppressed.

In the present embodiment, as the elements are illustrated in FIGS. 3A and 3B, the tether 122 is provided to be inclined downward toward the vehicle front side from the vehicle rear side in relation to the longitudinal up-down direction of the cushion 104. To further describe this orientation reference is made to line L2 which lies along the front edge of inner tube 112. Also, directions are shown in FIG. 3A "up", "down", "rear", and "front" relative to the vehicle but for the bag in a rolled flat undeployed condition. Line L3 is perpendicular to line L2 and as shown, tether 122 is inclined along line L1 in the downward direction in the vehicle forward direction relative to line L3. In particular, since the rear end on the vehicle rear side of the tether 122 is provided near the upper side of the lower opening 120, gas easily flows along the tether 122 inside the waist restraining portion 128. When the tether 122 is inclined downward toward the vehicle front side, it is possible to increase the internal pressure of the waist restraining portion 128 to pressure appropriate for restraint. Moreover, it is possible to retard the entrance of gas from the waist restraining portion 128 into the chest restraining portion 126 on the upper side to avoid an abrupt increase in the rigidity of the chest restraining portion 126.

In the void portion 134, gas can pass between the chest restraining portion 126 and the waist restraining portion 128. As described above, the vent hole 124 is formed in the main panel 108 of the cushion 104 near the void portion 134. When the vent hole 124 is formed at this position, a predetermined amount of gas having flowed into the waist restraining portion 128 on the lower side of the tether 122 can be efficiently discharged in the midway of flowing toward the chest restraining portion 126 on the upper side. Thus, it is possible to suppress an abrupt increase in the rigidity of the chest restraining portion 126.

In the present embodiment, due to the respective configurations, the restraint force of the chest restraining portion 126 during occupant restraint is suppressed. Thus, the cushion 104 does not need to adjust the restraint force based on the size of the diameter of the vent hole 124 and the diameter of the vent hole 124 can be decreased to be smaller than that of the conventional vent hole. That is, the cushion 104 can decrease the diameter of the vent hole 124 to suppress the amount of gas discharged from the vent hole 124 during occupant restraint and to increase the energy absorption amount of the cushion 104.

Figure 4A:
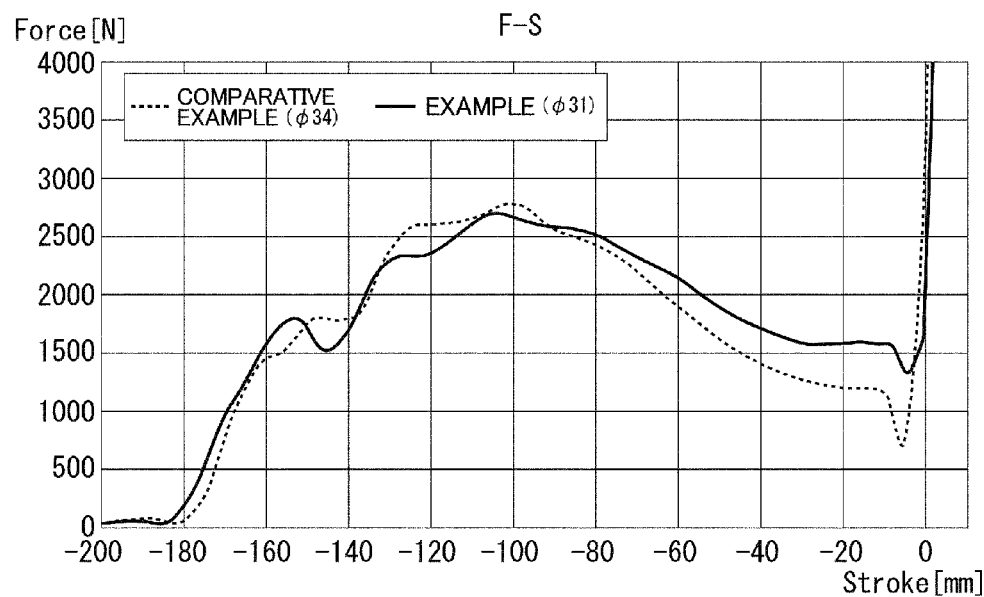
FIGS. 4A and 4B are diagrams illustrating a performance test of a cushion of Example according to the present embodiment and a cushion of Comparative Example.
Figure 4B:
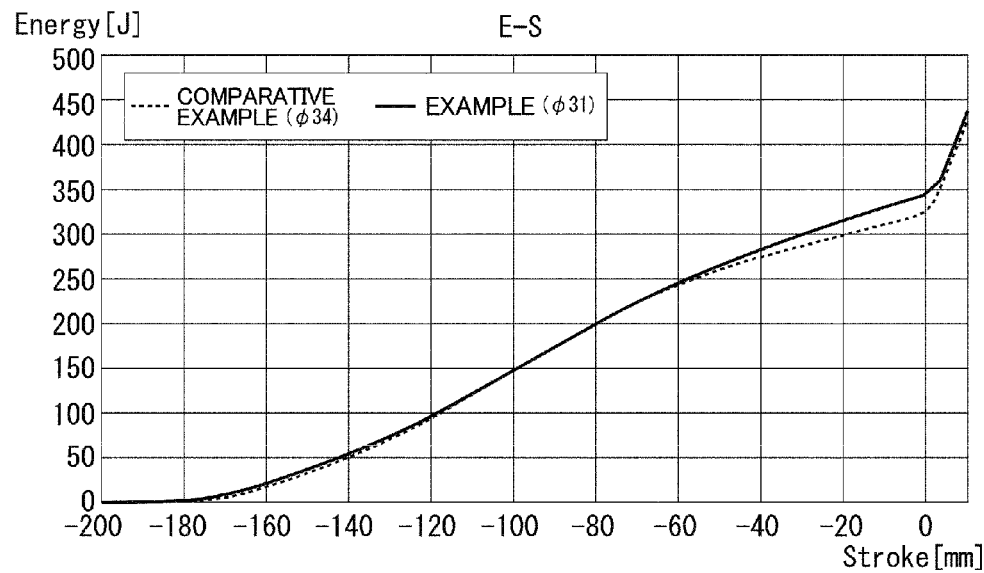

FIGS. 4A and 4B are diagrams illustrating a performance test of the cushion 104 of Example according to the present embodiment and a cushion of Comparative Example. FIG. 4A is a graph illustrating the measurement results of the restraint force of each cushion. The cushion 104 (see FIG. 1B and the like) of Example has the configuration described with reference to FIGS. 1A to 1C to FIGS. 3A and 3B and the diameter φ of the vent hole 124 is set to 31 mm. The cushion of Comparative Example has an inner space that is not partitioned and the diameter φ of the vent hole is set to 34 mm.

In the test, a test device (impactor) that simulates an occupant was caused to strike on the cushions of the respective side airbag devices from the vehicle interior side and the respective values were measured. The vertical axis represents restraint force (N) and the horizontal axis represents a moving distance (mm) of the impactor. The moving distance (mm) of the impactor was measured based on a moving distance (mm) of the impactor from the vehicle interior side toward the vehicle exterior side using a state in which the impactor was in contact with the door trim as a reference position of 0 mm.

When Example and Comparative Example are compared, the maximum values of the restraint force (N) are approximately the same. This means that, according to Example having the configuration of the present embodiment, even when the diameter of the vent hole 124 (see FIG. 1B and the like) is decreased (φ31<φ34), the maximum value of the restraint force (N) can be suppressed to be approximately the same as that of Comparative Example in which the vent hole has a larger diameter. That is, according to Example, it is possible to suppress the load on the chest of the occupant.

After the restraint force (N) reaches the maximum value, the restraint force (N) of Example is higher than that of Comparative Example particularly in the range of the moving distance between −80 mm and approximately −5 mm. This means that, since the vent hole 124 (see FIG. 1B and the like) of Example has a smaller diameter (φ31<φ34), it is possible to suppress a gas discharge amount when the impactor strikes thereon and to maintain the restraint force (N) more reliably.

FIG. 4B is a graph illustrating the measurement results of the energy absorption amount of each cushion. The vertical axis represents an energy absorption amount (J) and the horizontal axis represents the moving distance (mm) of the impactor. The energy absorption amount (J) is calculated as an integrated value of the energy absorption amount (J) of the cushion at the moving distance (mm).

When Example and Comparative Example are compared, the energy absorption amount (J) of Example is higher than that of Comparative Example in the range of the moving distance between −60 mm and approximately +5 mm. This means that, since the vent hole 124 (see FIG. 1B and the like) of Example has a smaller diameter (φ31<φ34), the energy absorption amount (J) against the impactor is larger.

As described above, it can be understood that, according to the cushion 104 (see FIG. 1B and the like) of the present embodiment, it is possible to suppress the maximum value of the restraint force (N) without increasing the diameter of the vent hole 124 (that is, the load on the chest of the occupant can be suppressed). Moreover, it can be understood that, since the diameter of the vent hole 124 can be set to be small, it is possible to maintain the restraint force (N) when the occupant is restrained and the energy absorption amount is large.

Figure 5:
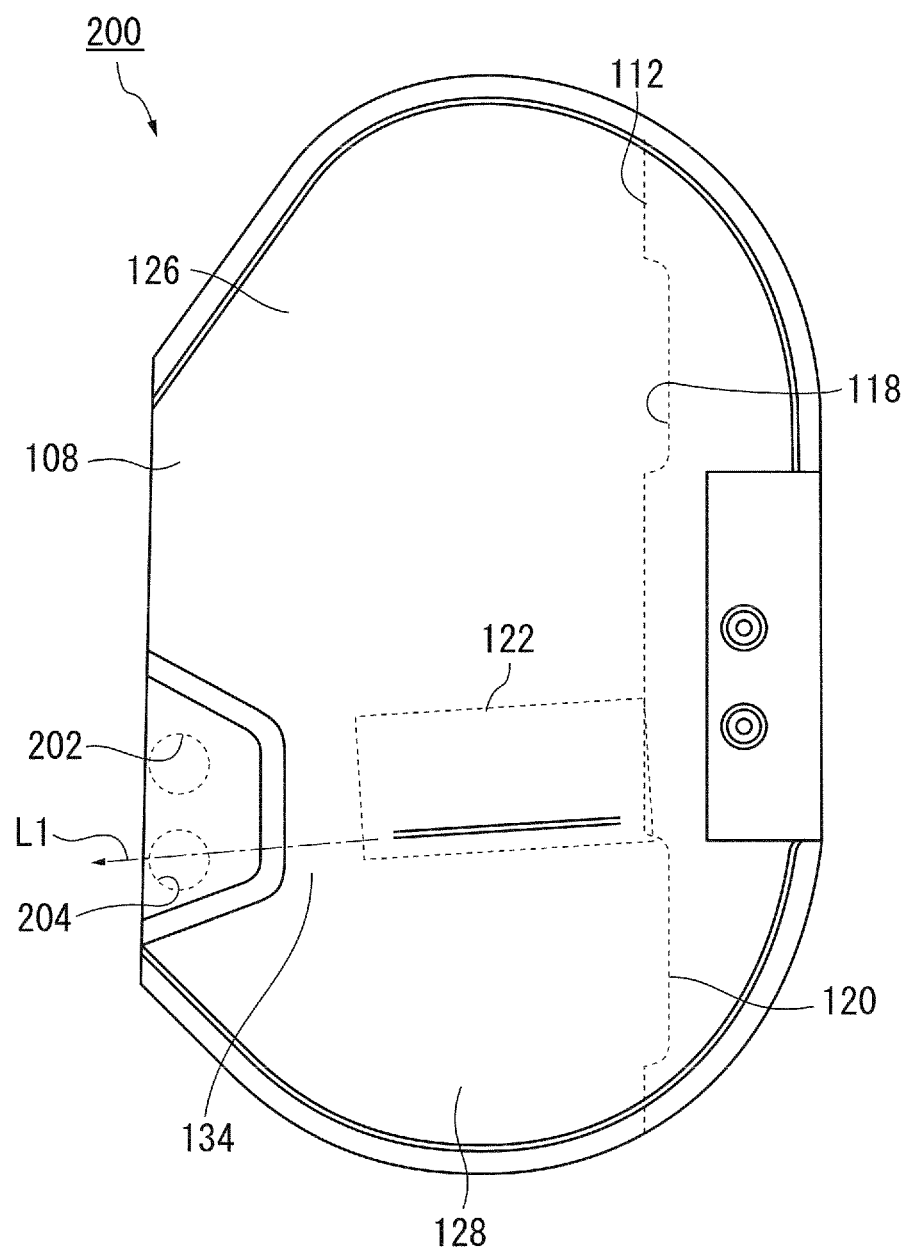
FIG. 5 is a diagram illustrating a modified example of the cushion illustrated in FIG. 3A showing the airbag in an undeployed, laid flat condition.

FIG. 5 is a diagram illustrating a modified example of the cushion 104 illustrated in FIG. 3A showing the airbag in an undeployed, laid flat condition. In a cushion 200, a vent hole 204 on the lower side among two vent holes 202 and 204 is provided on an extension line L1 of the tether 122 extending from the inner tube 112 which is downwardly inclined relative to a line L3 as drawn consistent with FIG. 3A. More specifically, the vent hole 204 is positioned on an extension line of a sewing portion of the tether 122 of FIG. 5, and the vent hole 204 is positioned on an extension line of the tether 122 along which the tether 122 spreads planarly during inflation and deployment of the cushion 200. According to this configuration, the gas flowing along the tether 122 can be discharged efficiently. For example, even when the diameter of the vent holes 202 and 204 is decreased as described above, it is possible to improve the discharge efficiency of gas flowing along the tether 122. Moreover, it is possible to suppress the input load on the occupant, for example, and to prevent the burst or the like of the main panel 108 immediately after activation of the inflator 110 (see FIG. 1B).

The present invention can be used for a side airbag device that restrains an occupant in a vehicle seat from a lateral side when an impact is imposed on the vehicle.

While the above description constitutes the preferred embodiment of the present invention, it will be appreciated that the invention is susceptible to modification, variation and change without departing from the proper scope and fair meaning of the accompanying claims.

What is claimed is:
1. A side airbag device comprising:
a cushion formed in a bag form formed from a first base fabric so as to be inflated and deployed toward a lateral side of an occupant in a vehicle seat;
an inflator provided on a vehicle rear side inside the cushion so as to supply an inflation gas;

an inner tube formed of a second base fabric and provided inside the cushion so as to surround the inflator and receive the inflation gas first, the inner tube is provided in a state in which a portion of the second base fabric disposed inside the cushion overlaps an outer circumferential portion of the cushion, and the portion of the second base fabric and the outer circumferential portion of the cushion are sewn together;

an upper opening formed in an upper portion of the inner tube so that the inflation gas can pass therethrough;

a lower opening formed in a lower portion of the inner tube so that the inflation gas can pass therethrough;

a partition wall formed of a third base fabric so as to extend toward a vehicle front side from a region between the upper opening and the lower opening of the inner tube and partitions the vehicle front side of the inside of the cushion into a chest restraining portion on an upper side and a waist restraining portion on a lower side;

a void portion provided inside the cushion at a position further toward the vehicle front side of the partition wall so that the inflation gas can pass between the chest restraining portion and the waist restraining portion; and a vent hole formed in the first base fabric of the cushion near the void portion so that the inflation gas can be discharged to the outside of the cushion, wherein the upper opening has a smaller opening area than the lower opening, and the partition wall is inclined downward toward the vehicle front side from the vehicle rear side with respect to a line perpendicular to the front edge of the inner tube.

2. The side airbag device according to claim 1 further comprising the vent hole is formed on an extension line of the partition wall extending from the inner tube.

3. The side airbag according to claim 1 further comprising wherein the partition wall is fastened to the fabric at vehicle lateral sides of the cushion and is free from attachment to the cushion at the vehicle front side and the vehicle rear side.

4. A side airbag device comprising:
a cushion formed in a bag form formed from a first base fabric so as to be inflated and deployed toward a lateral side of an occupant in a vehicle seat;

an inflator provided on a vehicle rear side inside the cushion so as to supply an inflation gas;

an inner tube formed of a second base fabric and provided inside the cushion so as to surround the inflator and receive the inflation gas;

an upper opening formed in an upper portion of the inner tube so that the inflation gas can pass therethrough;

a lower opening formed in a lower portion of the inner tube so that the inflation as can pass therethrough;

a partition wall formed of a third base fabric so as to extend toward a vehicle front side from a region between the upper opening and the lower opening of the inner tube and partitions the vehicle front side of the inside of the cushion into a chest restraining portion on an upper side and a waist restraining portion on a lower side, an end on the vehicle rear side of the partition wall is in contact with the inner tube upon inflation of the side airbag;

a void portion provided inside the cushion at a position further toward the vehicle front side of the partition wall so that the inflation as can pass between the chest restraining portion and the waist restraining portion; and a vent hole formed in the first base fabric of the cushion near the void portion so that the inflation gas can be discharged to the outside of the cushion, wherein the upper opening has a smaller opening area than the lower opening, and the partition wall is inclined downward toward the vehicle front side from the vehicle rear side with respect to a line perpendicular to the front edge of the inner tube.

5. The side airbag device according to claim 4 further comprising the vent hole is formed on an extension line of the partition wall extending from the inner tube.

6. The side airbag according to claim 4 further comprising wherein the partition wall is fastened to the fabric at vehicle lateral sides of the cushion and is free from attachment to the cushion at the vehicle front side and the vehicle rear side.

7. A side airbag device comprising:
a cushion formed in a bag form formed from a first base fabric so as to be inflated and deployed toward a lateral side of an occupant in a vehicle seat;

an inflator provided on a vehicle rear side inside the cushion so as to supply an inflation gas;

an inner tube formed of a second base fabric and provided inside the cushion so as to surround the inflator and receive the inflation gas;

an upper opening formed in an upper portion of the inner tube so that the inflation gas can pass therethrough;

a lower opening formed in a lower portion of the inner tube so that the inflation gas can pass therethrough;

a partition wall formed of a third base fabric so as to extend toward a vehicle front side from a region between the upper opening and the lower opening of the inner tube and partitions the vehicle front side of the inside of the cushion into a chest restraining portion on an upper side and a waist restraining portion on a lower side, wherein the partition wall is positioned adjacent to an upper edge of the lower opening;

a void portion provided inside the cushion at a position further toward the vehicle front side of the partition wall so that the inflation gas can pass between the chest restraining portion and the waist restraining portion; and a vent hole formed in the first base fabric of the cushion near the void portion so that the inflation gas can be discharged to the outside of the cushion, wherein the upper opening has a smaller opening area than the lower opening, and the partition wall is inclined downward toward the vehicle front side from the vehicle rear side with respect to a line perpendicular to the front edge of the inner tube.

8. The side airbag device according to claim 7 further comprising the vent hole is formed on an extension line of the partition wall extending from the inner tube.

9. The side airbag according to claim 7 further comprising wherein the partition wall is fastened to the fabric at vehicle lateral sides of the cushion and is free from attachment to the cushion at the vehicle front side and the vehicle rear side.

* * * * *